Figure 1:
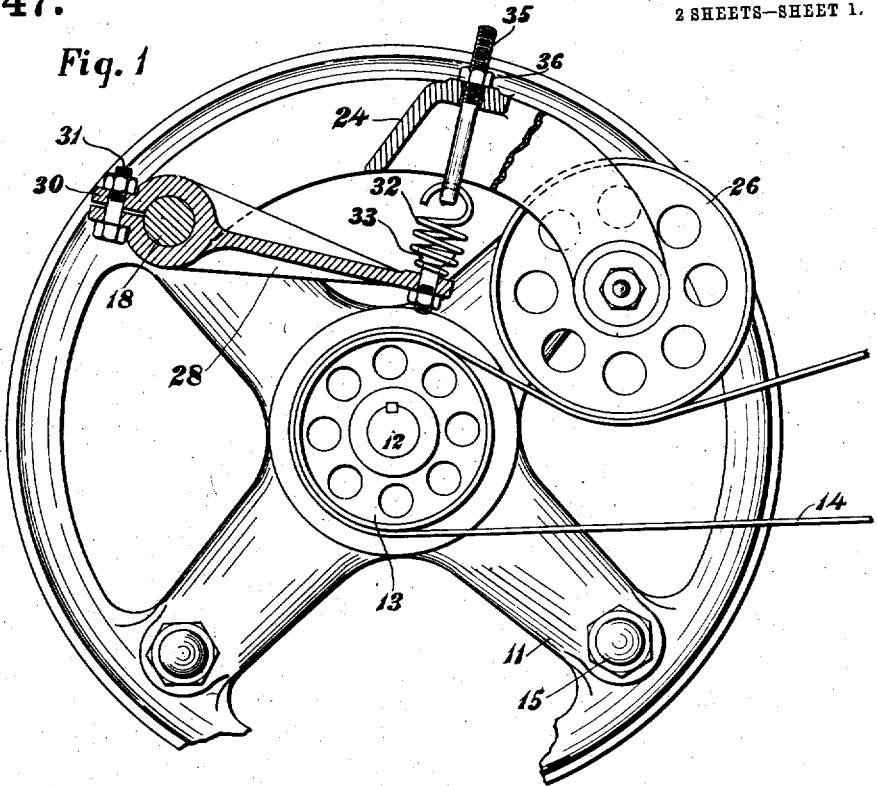

A. F. KWIS.
BELT TIGHTENER.
APPLICATION FILED JUNE 8, 1906.

960,347.

Patented June 7, 1910.
2 SHEETS—SHEET 1.

WITNESSES
Oliver W. Sharman
Fred J. Kinsey

Arthur F. Kwis
INVENTOR
By Chas. E. Lord
ATTORNEY

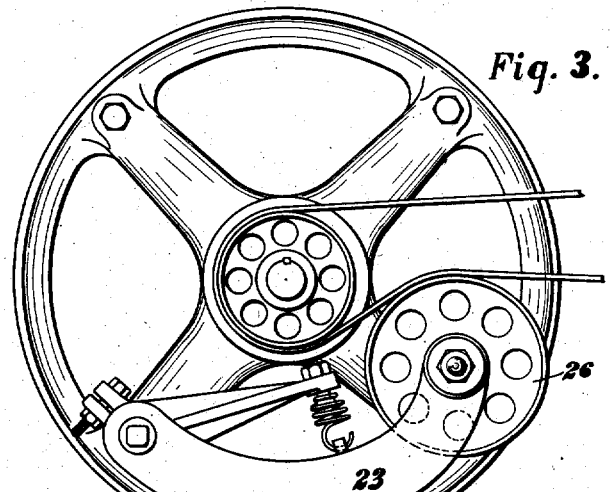
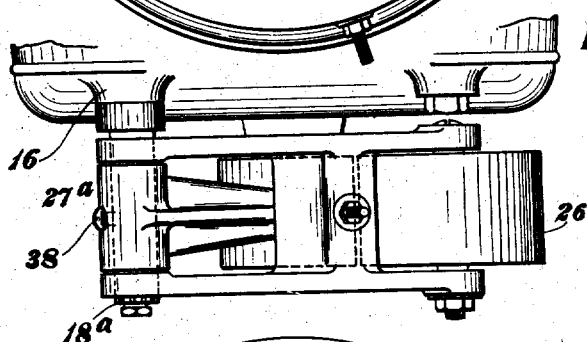
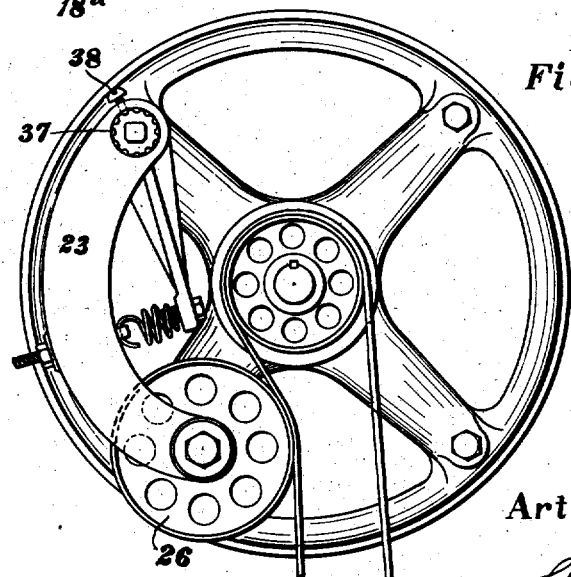

UNITED STATES PATENT OFFICE.

ARTHUR F. KWIS, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

BELT-TIGHTENER.

960,347.  Specification of Letters Patent.  Patented June 7, 1910.

Application filed June 8, 1906. Serial No. 320,737.

*To all whom it may concern:*

Be it known that I, ARTHUR F. KWIS, a citizen of the United States, residing at Norwood, in the county of Hamilton and State of Ohio, have invented certain new and useful Improvements in Belt-Tighteners, of which the following is a full, clear, and exact specification.

My invention relates to belt-tighteners and especially to belt-tighteners adapted for use in connection with electric motors, although this invention is not limited in its application to such use. Frequently small high speed motors are employed for driving machine or shaft pulleys the speeds of which are required to be much lower than the speeds of the motors. It is necessary therefore to employ a pulley on the motor shaft much smaller than the driven pulley. If the difference in the diameters of the pulleys is great, there will be small angle of contact between the motor pulley and the driven belt especially if the belt is short. Therefore, there may be considerable slip between the motor pulley and the belt, and if the load is very great, the motor will be unable to drive the belt at all, unless a belt-tightener or idler pulley is employed for increasing the contact surface between the motor pulley and the belt.

One of the objects of my invention is to provide a belt-tightener for an electric motor which may be applied to an ordinary standard motor casing without in any way necessitating any changes in the latter.

A further object is to provide for a motor, a belt tightener, the idler pulley of which may be adjusted to properly engage the belt for any position of the motor or direction in which the belt may extend from the motor pulley or for either direction of rotation of the motor.

In carrying out my invention I provide a belt tightener comprising an arm or frame pivoted to a support and carrying at its outer end an idler pulley, which arm is yieldingly pressed downward toward the belt by a spring having an abutment also on the support, which abutment may be adjusted to any desired angular position to adjust the tension of the pulley on the belt or to adjust the position of the idler pulley.

In another aspect my invention consists in an electric motor comprising a frame or yoke, and an end-head secured to the frame or yoke by a plurality of bolts, one of which projects outward from the end-head, a belt tightener mounted on said outwardly projecting bolt, said belt tightener comprising a pivoted spring pressed arm having an idler pulley on its outer free end, and means for adjusting the position of the pulley.

My invention still further consists in the details of construction and the combinations of elements described in the specification and set forth in the appended claims.

For a better understanding of my invention, reference is had to the accompanying drawings in which—

Figure 2:
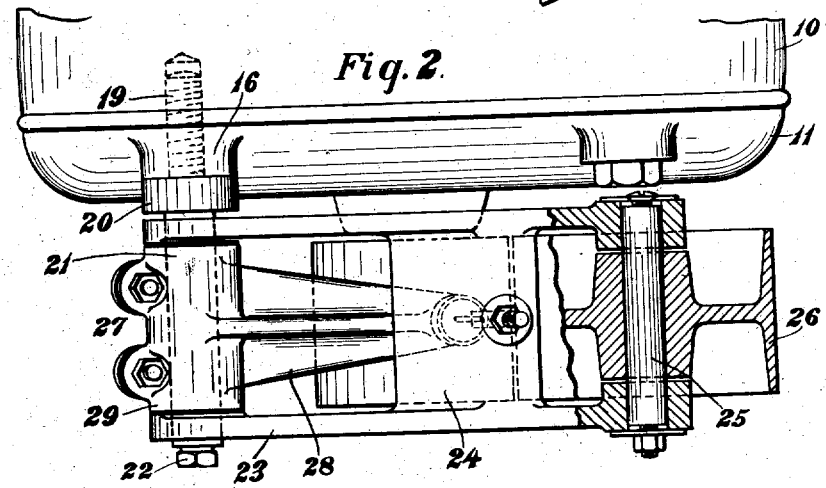

Figure 1 is a partial end elevation of a motor equipped with one of my improved belt tighteners, part of the belt tightener being shown in section; Fig. 2 is a plan view of the same, parts being broken away; Fig. 3 is an end elevation of the motor and belt tightener on a slightly reduced scale, the belt tightener being shown in a different position from that shown in Fig. 1; Fig. 4 is an end elevation of the motor equipped with a slightly modified type of belt tightener; and Fig. 5 is a plan view of the belt tightener and of a portion of the motor shown in Fig. 4.

Electric motors may be placed in any position relative to the driven machine and pulley, and may be mounted on the floor or ceiling; also motors for driving certain kind of machines must be capable of rotating in either direction of rotation. If the direction of the belt is changed, or if the direction of the motor is changed, of course the position of the belt tightener must be changed. As my belt-tightener is capable of adjustment for changes in position or direction of the belt or for changes in direction of rotation of the driving pulley, it is especially adapted for use in connection with electric motors, and I have therefore illustrated it as applied to such a motor.

Referring to the different figures of the drawing, I have shown at 10 a motor having an end-head 11 which has a bearing for a shaft 12. Mounted on the end of the shaft is a driving pulley 13 around which extends the driving belt 14. At 15 are shown a number of equally spaced bolts for securing the end-head to the casing, which bolts pass through lugs 16 on the end-head.

My improved belt tightener is mounted on a special bolt or stud 18 extending outwardly a suitable distance from the end-head. This bolt 18 replaces one of the usual bolts 15, being provided with a threaded portion 19 having the same diameter as the bolts 15, and adapted to be screwed tightly into any one of the threaded holes for the bolts 15 so as to assist in securing the end-head in position as well as supporting the belt tightener. This supporting bolt 18 may be substituted for any one of the bolts 15 and the belt tightener can thus be supported in a variety of positions around the motor pulley. The bolt 18 is provided with a shoulder 20 adapted to engage the lug on the end-head and with a comparatively long cylindrical portion 21 larger in diameter than the threaded portion 19. The bolt is also provided at its outer end with a squared portion 22 by means of which the bolt can be screwed into position. Pivoted on the bolt or stud 18 is a member having in this instance two curved or arched arms 23 joined together by a bridging member 24. The arms carry at their outer free ends a pin or stud 25 on which is mounted an idler pulley 26 adapted to bear upon the belt. Also mounted upon the bolt or stud 18 is a normally stationary member 27 having a forwardly extending arm 28 and a split collar 29 provided with lugs 30 and tightening bolts 31 by means of which the member 27 can be clamped on the supporting bolt. At 32 is shown a tension spring for holding the idler pulley yieldingly upon the belt. This spring is secured at one end to the hemispherical head 33 of a bolt mounted in the outer end of the forwardly extending arm 28 of the clamping member and at its other end to the end of a threaded bolt 35 passing loosely through the bridging portion 24 of the pivoted member. The bolt is supported in position by a nut 36, by adjusting which the position of the pivoted member can be adjusted. It is seen that the normally stationary clamping member 27 forms an abutment for the spring 32.

When the belt tightener is mounted on the bolt or stud the abutment for the spring is clamped in such a position as will approximately give the proper tension of the spring and hence the proper pressure of the pulley upon the belt. The nut 36 on the bolt 35 can then be adjusted to obtain the exact desired or necessary pressure of the pulley on the belt. If it is desired to adjust the position of the pulley a considerable extent, the abutment can be adjusted on the bolt by loosening the bolts 31 in the split clamping collar. If the position of the motor or the direction of the belt is different from that shown in Fig. 1, the bolt 18 may be supported in another position. With the motor construction here shown the bolt or stud on which the belt tightener is mounted may be placed in four different positions. In Fig. 3 the belt tightener is shown in the proper position when the direction of the movement of the belt is reversed with respect to that shown in Fig. 1.

In Figs. 4 and 5 is shown a slight modification of my invention. The belt tightener here shown differs from that above described in the clamping means for the stationary member which forms the abutment for the spring. In this case the bolt or stud 18$^a$ upon which the belt tightener is mounted is provided with a large number of grooves or slots 37. The stationary member 27$^a$ instead of being provided with a split clamping collar 28 as in the first case is in the form of a complete sleeve or collar adapted to be slipped onto the grooved portion of the bolt and to be held in position by means of a set screw 38 adapted to fit in any one of the grooves or slots in the bolt. This construction may be preferable in case the tension of the spring is considerable to avoid any danger of the abutment slipping on the supporting stud or bolt.

It is seen that my belt tightener can be mounted on a motor casing without in any way changing the casing or without requiring any special construction of the latter. Furthermore, the belt tightener can be adjusted for any position of the belt or direction of rotation, and for any desired pressure of the pulley upon the belt.

Many changes can be made in the details of construction without involving a departure from the spirit and scope of my invention, and I do not wish to be confined in my claims to the specific details shown.

What I claim as new and desire to secure by Letters Patent is:—

1. In combination, a shaft, an idler-pulley adjacent said shaft, a pivoted supporting arm for said pulley, a normally stationary abutment, a spring between the abutment and the pivoted supporting arm, and means whereby the abutment may be adjusted to any desired position about the fulcrum of the supporting arm so as to adjust the position of the supporting arm and of the idler-pulley.

2. In combination, a shaft, a belt tightener comprising a pivoted arm and an idler pulley, a spring for pressing the pulley yieldingly on the belt, a normally stationary abutment for one end of the spring, and means for adjusting the abutment to any desired angular position about the fulcrum of said pivoted arm.

3. In combination, a shaft, a support, a bolt or stud extending from said support, an arm pivoted on said bolt or stud, an idler pulley on the outer end of said arm, a normally stationary member clamped to said bolt or stud, a spring between said arm and said member, and means for clamping said member in various positions of adjustment.

4. In combination, a motor frame, a bolt extending outwardly therefrom, and a belt tightener comprising a normally stationary abutment supported on said bolt and adjustable about the same, an idler pulley, an arm carrying said idler pulley, said arm being pivotally mounted on the bolt and being freely movable about the same relative to the abutment, and a spring between the abutment and arm.

5. In combination, an electric motor, a bolt or stud extending outwardly therefrom, and a belt tightener comprising an abutment, an arm movable with respect thereto and an idler-pulley carried by said arm, said arm and abutment being mounted directly on said bolt or stud.

6. In combination, an electric motor, a bolt or stud extending outwardly therefrom, a belt tightener comprising an abutment, and a pivoted yieldingly held arm and an idler-pulley carried by said arm, both said abutment and arm being mounted directly on said bolt or stud.

7. In combination, an electric motor, a bolt or stud extending outwardly therefrom, and a belt tightener comprising a spring pressed member pivoted to said bolt or stud, an idler pulley carried by said member, and means for adjusting the belt tightener about said bolt or stud.

8. In combination, an electric motor comprising a frame and end-head, a plurality of bolts for securing said end-head to the frame, one of said bolts extending outwardly from the end-head, and a belt tightener comprising a pivoted arm and an idler pulley, said arm being mounted directly on said outwardly extending bolt.

9. In combination, an electric motor comprising a frame and end-head, a plurality of bolts securing the end-head to the frame, a belt tightener comprising an idler pulley, a pivoted arm carrying said idler pulley, a normally stationary member, said arm and normally stationary member being both mounted on one of said bolts, the stationary member being adjustable about the bolt on which it is mounted and the pivoted arm being freely movable about the bolt relative to the normally stationary member, and a spring between the latter and the pivoted arm.

10. In combination, an electric motor, a bolt extending outwardly from the frame thereof, a belt tightener comprising a pivoted arm, an idler-pulley on the end thereof, a stationary abutment, a spring for yieldingly pressing the pulley on the belt, and means for adjusting the tension of said spring, said pivoted arm and said stationary abutment being mounted directly on said bolt.

In testimony whereof I affix my signature, in the presence of two witnesses.

ARTHUR F. KWIS.

Witnesses:
RUBY ELLA ROBINSON,
FRED J. KINSEY.

---

Corrections in Letters Patent No. 960,347.

It is hereby certified that in Letters Patent No. 960,347, granted June 7, 1910, upon the application of Arthur F. Kwis, of Norwood, Ohio, for an improvement in "Belt-Tighteners," errors appear in the printed specification requiring correction as follows: Page 1, line 89, the words "of rotation" should be stricken out, and same page, line 91, after the word "direction," the words *of rotation* should be inserted; and that the said Letters Patent should be read with these corrections therein that the same may conform to the record of the case in the Patent Office.

Signed and sealed this 12th day of July, A. D., 1910.

[SEAL.]

C. C. BILLINGS,

*Acting Commissioner of Patents.* said member, and means for clamping said member in various positions of adjustment.

4. In combination, a motor frame, a bolt extending outwardly therefrom, and a belt tightener comprising a normally stationary abutment supported on said bolt and adjustable about the same, an idler pulley, an arm carrying said idler pulley, said arm being pivotally mounted on the bolt and being freely movable about the same relative to the abutment, and a spring between the abutment and arm.

5. In combination, an electric motor, a bolt or stud extending outwardly therefrom, and a belt tightener comprising an abutment, an arm movable with respect thereto and an idler-pulley carried by said arm, said arm and abutment being mounted directly on said bolt or stud.

6. In combination, an electric motor, a bolt or stud extending outwardly therefrom, a belt tightener comprising an abutment, and a pivoted yieldingly held arm and an idler-pulley carried by said arm, both said abutment and arm being mounted directly on said bolt or stud.

7. In combination, an electric motor, a bolt or stud extending outwardly therefrom, and a belt tightener comprising a spring pressed member pivoted to said bolt or stud, an idler pulley carried by said member, and means for adjusting the belt tightener about said bolt or stud.

8. In combination, an electric motor comprising a frame and end-head, a plurality of bolts for securing said end-head to the frame, one of said bolts extending outwardly from the end-head, and a belt tightener comprising a pivoted arm and an idler pulley, said arm being mounted directly on said outwardly extending bolt.

9. In combination, an electric motor comprising a frame and end-head, a plurality of bolts securing the end-head to the frame, a belt tightener comprising an idler pulley, a pivoted arm carrying said idler pulley, a normally stationary member, said arm and normally stationary member being both mounted on one of said bolts, the stationary member being adjustable about the bolt on which it is mounted and the pivoted arm being freely movable about the bolt relative to the normally stationary member, and a spring between the latter and the pivoted arm.

10. In combination, an electric motor, a bolt extending outwardly from the frame thereof, a belt tightener comprising a pivoted arm, an idler-pulley on the end thereof, a stationary abutment, a spring for yieldingly pressing the pulley on the belt, and means for adjusting the tension of said spring, said pivoted arm and said stationary abutment being mounted directly on said bolt.

In testimony whereof I affix my signature, in the presence of two witnesses.

ARTHUR F. KWIS.

Witnesses:
RUBY ELLA ROBINSON,
FRED J. KINSEY.

---

It is hereby certified that in Letters Patent No. 960,347, granted June 7, 1910, upon the application of Arthur F. Kwis, of Norwood, Ohio, for an improvement in "Belt-Tighteners," errors appear in the printed specification requiring correction as follows: Page 1, line 89, the words "of rotation" should be stricken out, and same page, line 91, after the word "direction," the words *of rotation* should be inserted; and that the said Letters Patent should be read with these corrections therein that the same may conform to the record of the case in the Patent Office.

Signed and sealed this 12th day of July, A. D., 1910.

[SEAL.]

C. C. BILLINGS,
*Acting Commissioner of Patents.*

It is hereby certified that in Letters Patent No. 960,347, granted June 7, 1910, upon the application of Arthur F. Kwis, of Norwood, Ohio, for an improvement in "Belt-Tighteners," errors appear in the printed specification requiring correction as follows: Page 1, line 89, the words "of rotation" should be stricken out, and same page, line 91, after the word "direction," the words *of rotation* should be inserted; and that the said Letters Patent should be read with these corrections therein that the same may conform to the record of the case in the Patent Office.

Signed and sealed this 12th day of July, A. D., 1910.

[SEAL.]

C. C. BILLINGS,
*Acting Commissioner of Patents.*